United States Patent [19]

Lee

[11] Patent Number: 5,048,099

[45] Date of Patent: Sep. 10, 1991

[54] POLYGON-BASED METHOD FOR AUTOMATIC EXTRACTION OF SELECTED TEXT IN A DIGITIZED DOCUMENT

[75] Inventor: Yongchun Lee, Rochester, N.Y.

[73] Assignee: Eastman Kodak Company, Rochester, N.Y.

[21] Appl. No.: 526,425

[22] Filed: May 21, 1990

[51] Int. Cl.⁵ .............................................. G06K 9/48
[52] U.S. Cl. ...................................... 382/22; 382/16; 382/61; 382/9
[58] Field of Search .................... 382/16, 19, 21, 22, 382/48, 61, 47, 49, 9, 60, 66, 59, 58

[56] References Cited

U.S. PATENT DOCUMENTS

| | | | |
|---|---|---|---|
| 4,680,805 | 7/1987 | Scott | 382/22 |
| 4,736,310 | 4/1988 | Celthorpe et al. | 364/526 |
| 4,777,651 | 10/1988 | McCann et al. | 382/21 |
| 4,817,166 | 3/1989 | Gonzalez et al. | 382/48 |
| 4,853,971 | 8/1989 | Nonura | 382/22 |
| 4,856,074 | 8/1989 | Nagaoka | 382/21 |
| 4,901,365 | 2/1990 | Kelland | 382/61 |
| 4,933,984 | 6/1990 | Nakano et al. | 382/61 |

*Primary Examiner*—Michael Razavi
*Attorney, Agent, or Firm*—Dennis R. Arndt

[57] ABSTRACT

A threshold free algorithm is used to extract text in a region which has been circled with any hand drawn shape of any size that consitutes a closed curve. Use of this technique allows an operator to select intensity regions in text material in a paper-based document and automate the extraction of the enclosed text in the digitized image of the document.

4 Claims, 10 Drawing Sheets

---

PROHIBITION OF CORPORATE ASSETS FOR ILLEGAL PURPOSES

The company policy prohibiting the use of corporate funds and other assets for illegal purposes includes, but is not limited to, the following:

1. The use of corporate funds or assets for
   (a) unlawful or improper purposes including payments, gifts, or loans, either directly or indirectly, to foreign or domestic government officials or employees,
   (b) labor organizations or any officer, official or agent thereof, or
   (c) to any other person as a commercial bribe or kickback.

These payments include, but are not limited to, payments, gifts or loans to any agent or third party (whether cast in the form of commissions, payments or fees for goods and services received or otherwise) on behalf of the Company with the understanding or under certain circumstances that suggest that all or any part thereof may be paid by the recipient to any of the foregoing persons for any of the foregoing reasons.

2. The use of corporate assets or funds for domestic or foreign political contributions Officers and employees are encouraged to make personal political contributions to candidates and organizations of their choice. However, it must be clearly understood that the officer or employee making the contribution will bear the entire financial burden. The Company cannot and will not recognize that such payments constitute a corporate obligation and no officer or employee should attempt, directly or indirectly, to pass on such contribution, in whole or in part, to the Company.

All officers and employees have a continuing affirmative obligation to adhere to this policy and to report any violation of the policy to the Chief Executive Officer or the corporate Internal Auditing Department.

Annually, selected employees will be expected to complete forms attesting to their review and understanding of this policy and commenting on whether or not they or any of their subordinates, peers, or supervisors might have any knowledge of activities which could be considered in violation of this policy.

The term "Company" includes and all affiliated companies.

PROHIBITION OF CORPORATE ASSETS FOR ILLEGAL PURPOSES

The company policy prohibiting the use of corporate funds and other assets for illegal purposes includes, but is not limited to, the following:

1. The use of corporate funds or assets for
   (a) unlawful or improper purposes including payments, gifts, or loans, either directly or indirectly, to foreign or domestic government officials or employees,
   (b) labor organizations or any officer, official or agent thereof, or
   (c) to any other person as a commercial bribe or kickback.

These payments include, but are not limited to, payments, gifts or loans to any agent or third party (whether cast in the form of commissions, payments or fees for goods and services received or otherwise) on behalf of the Company with the understanding or under certain circumstances that suggest that all or any part thereof may be paid by the recipient to any of the foregoing persons for any of the foregoing reasons.

2. The use of corporate assets or funds for domestic or foreign political contributions. Officers and employees are encouraged to make personal political contributions to candidates and organizations of their choice. However, it must be clearly understood that the officer or employee making the contribution will bear the entire financial burden. The Company cannot and will not recognize that such payments constitute a corporate obligation and no officer or employee should attempt, directly or indirectly, to pass on such contribution, in whole or in part, to the Company.

All officers and employees have a continuing affirmative obligation to adhere to this policy and to report any violation of the policy to the Chief Executive Officer or the corporate Internal Auditing Department.

Annually, selected employees will be expected to complete forms attesting to their review and understanding of this policy and commenting on whether or not they or any of their subordinates, peers, or supervisors might have any knowledge of activities which could be considered in violation of this policy.

The term "Company" includes            and all affiliated companies.

\* = black pixels

$A = \sum \theta_i = 2\pi, \quad i = 1,2,3,4,5,6$

FOR COMPONENTS INSIDE POLYGON

FIG. 7a

$A = \sum \theta_i = 0, \quad i = 1,2,3,4,5,6$

FOR COMPONENTS OUTSIDE POLYGON

POLYGON-BASED METHOD FOR AUTOMATIC EXTRACTION OF SELECTED TEXT IN A DIGITIZED DOCUMENT

CROSS REFERENCE TO RELATED APPLICATIONS

Reference is made to commonly-assigned, copending U.S. patent application Ser. No. 526,928, entitled "A Method Of Detecting Skew In Form Images", and U.S. patent application Ser. No. 526,928, entitled "A Polygon-Based Technique For The Automatic Classification Of Text And Graphics Components From Digitized Paper-Based Forms", each filed in the name of Yongchun Lee and filed concurrently herewith.

TECHNICAL FIELD OF THE INVENTION

The present invention relates to image processing techniques in general, and more particularly, to a text region extracting technique which allows for the selection of text regions of interest which are circled with any size and shape of hand drawn closed curves in a paper-based document by the automatic extraction of the text in the digitized image of that document.

BACKGROUND OF THE INVENTION

Increasing emphasis is being placed on the realization that computer based systems are now capable of providing automated analysis and interpretation of paper-based documents. The move from paper-based documentation towards computerized storage and retrieval systems has been prompted by the many advantages to be gained from the electronic document environment. A clear advantage is the efficiency of storage, transmission and retrieval, because paper-based information of almost any kind may be more efficiently processed in a computerized form. Document update and revision capability provided by a computerized form may be the most significant gain over the paper-based medium. For a system to enable image revision and update, it is necessary to automate the data capture process rather than re-create the data in digital from. Accordingly, it is necessary to generate a description of graphical elements in the document (rather than a bit-map) in order to allow easy editing and to decrease the storage and processing time.

Automatic word processing units are increasingly being employed in office use for producing, modifying, and storing written documents in an economic and time-saving manner. Such units have the capability of undertaking error corrections, insertion of new text passages, combining two or more texts having different origins, and random reproduction and electronic storage of data corresponding to the text passages. The advantages of such automatic word processing units in comparison to conventional typewriters are the flexibility and time-saving in the production of written documents which can be generated by such units, and the higher efficiency resulting therefrom. A particularly time consuming step associated with the use of automatic word processing units is the transfer of information already existing on paper into the automatic word processing unit for storage and/or further processing.

Manual transfer by keyboard of large amounts of text is extremely time consuming and accordingly, various method and devices have been developed for automatically transferring the information contained in texts into the word processing unit. One such device is a digitizer or the like for reading a drawing or the like to input data to a computer, in which the reading indicator for the coordinates is manually moved to feature points such as end points and inflicion or bending points of lines so that the read coordinates are stored in the computer. In this case, the identification of the lines is also manually inputted into the computer by another means. The discrimination of lines in accordance with this method is performed by the human pattern recognition ability and the font definitely prevents the digitized operations from being fully automated.

A problem in the automatic transfer of existing information contained in text passages into a word processing unit is that the master on which such text passages occur may also contain graphics and/or image areas. It is a problem in the art to automatically identify, classify and store these different types of information areas on a master in order to achieve an optimum coding of the data representing these different master areas as well as to permit separate manipulation of the data representing those areas within the word processor.

In the past, to remove or cut regions of text or sentences in a digitized document, required the aid of an interactive software package along with a "mouse" to allow an operator to specify window locations (rectangular area) around the selected text that is to be cut. It is, however, more natural and easy for an operator to select text regions by hand drawing boundaries on a paper document and let the computer automatically extract the marked regions in the digital domain after the document has been scanned. This form of text extraction requires an algorithm to identify the hand drawn components and locate their spatial coordinates in a digital document. The boundary coordinates of the identified hand drawn curves are then used to separate the integral text material from the external text outside the hand drawn boundaries.

Prior art practices were unable to identify the hand drawn curves when the document has characters of different sizes and styles. An area (or size) threshold fails to extract small hand drawn components when their sizes are smaller than some of the characters. Because hand drawn curves are unconstrained symbols which can be any shape, it is impossible to use pattern recognition techniques (statistical or structural analysis) for the recognition of a hand drawn symbol without prior information concerning the hand drawn symbol.

The present invention overcomes the problems mentioned above using a threshold free technique to identify any size or shape of hand drawn closed curve in a document. The boundary coordinates of the identified curves are then used to locate text inside the curves. By blanking out the external text material, the output image will contain only the desired text being selected.

DISCLOSURE OF THE INVENTION

The present invention is directed to image processing and discloses a method of extracting text in which text regions of interest on a paper document are circled with any size or shape of hand drawn closed curve so that the circled text regions can be automatically extracted after the document has been digitized (electronic document in the form of a bitmap image). The method uses the technique of geometrical spatial relationship of the contours to identify the hand drawn components and uses those contours for the extraction of the desired text material enclosed therein.

BRIEF DESCRIPTION OF THE DRAWINGS

FIG. 1 shows an example of a marked document;

MODES OF CARRYING OUT THE INVENTION

The present invention provides the capability for automatically extracting text regions that are circled by a dark pen 12 in a document 10 as shown in FIG. 1. The marked document 10 is scanned or digitized to convert the paper document to an electronic document (a bitmap image).

Contour vectorization is the first in several steps needed to achieve the extraction of the desired text regions. Contour vectorization converts an electronic document into a collection of polygons. This conversion requires contour pixel tracing followed by piecewise linear approximation of the contour pixels.

Figure 2A:
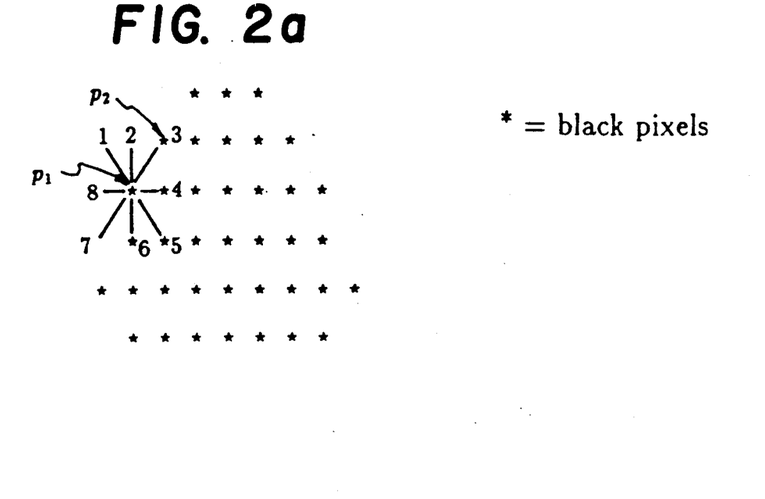
FIG. 2 shows a pixel neighborhood and the pixel search order.
Figure 2B:
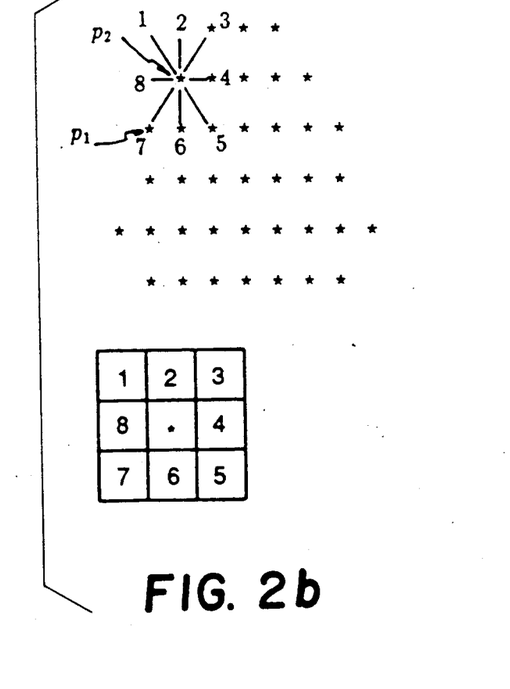

The contour pixel tracing operation starts by scanning pixels in a horizontal direction. Whenever a transition from 0 to 1 is detected, it traces the contour in a rotational order until it returns to the starting point for the completion of a contour. The rotational order that the search is performed is illustrated in FIG. 2. The pixel $p_1$, is a transition which is detected by scanning the document page from left to right. Using a three by three grid shown in FIG. 2c with the center pixel being $p_1$ the first transition and looking in the specified search order 1-8 of FIG. 2c until the next transition is located. In the instance, $p_2$ was located in cell number 3 of the three by three grid. That pixel was located using the rule of adding a value of four to the previous direction using module 8 arithmetic, and adding one of the result. $p_2$ in FIG. 2b is now the central pixel in the three by three grid in the same search order thus locating the transition in cell 3. The next pixel in the search starting from pixel in direction 8. The process is repeated until a closed contour is completed. After completion of a contour tracing, scanning resumes to find the next transition and then traces the next contour. This process is repeated until the last contour has been completed. The contour tracing process provides two major advantages, contour isolation and data compression, for later hand drawn curve extraction, because the resulting collection of contours requires less memory for data storage and only the contour of the black areas are stored. According to the contour tracing rule, an outer contour goes clockwise and an inner contour is in a counterclockwise direction. The contour orientation is embedded in the sequence of the contour pixels. It is a useful feature for discrimination of outer and inner contours.

Piecewise Linear Approximation

Figure 3A:
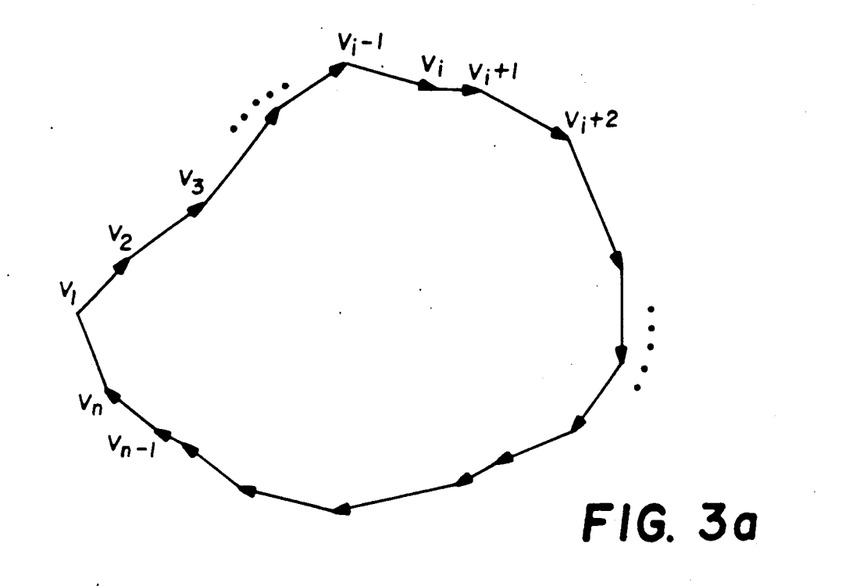
FIG. 3a illustrates graphically the linear approximation of a polygon which results in a number of short almost coincident vectors that are replaced by a single vector in their place.

The piecewise linear approximation process converts a sequence of contour pixels into a sequence of vectors by merging colinear pixels. The sequence of vectors forming a closed boundary becomes a polygon as shown in FIG. 3. The piecewise linear approximation process is modified somewhat by imposing an inner product constraint which allows for the detection of sharp corners during iteration. Sequentially scan the contour pixel and merge the consecutive pixels which lie on the same straight line into vectors. This forms a polygon which is composed of a sequence of short vectors as shown in FIG. 3. The vertices of a polygon are denoted by $(V_1, V_2, V_3 \ldots V_i \ldots V_n)$. Calculation of normalized inner product of any two consecutive vectors (e.g. $V_i$ and $V_{i+1}$)
where $$I_i = \frac{v_{i-1}v_i \cdot v_iv_{i+1}}{|v_{i-1}v_i| |v_iv_{i+1}|}$$

and $$-1 \leq I_i \leq 1$$

By considering any three consecutive points $v_{i-1}$, $v_i$, $v_{i+1}$ and $v_{i-1}$, $v_{i+1}$ form the sides of a triangle $v_{i-1}$, $v_i$, $v_{i+1}$. The line segment $v_{i-1}$, $v_{i+1}$ is the base of $\Delta - v_{i-1}$, $v_i$, $v_{i+1}$. The height of $\Delta\ v_{i+1}$, $v_i$, $v_{i+1}$ serves as the deviation for approximating the series of $V_{i-1}$, $V_i$ and $v_i$, $v_{i+1}$, to $v_{i-1}$, $v_{i+1}$. If the deviation is smaller than a predetermined threshold ($\epsilon$) and $I_i$ is greater than a predetermined negative value the approximator described above is applied. Otherwise, the part $v_i$ is kept and the next two consecutive segments are exposed for linear approximation.

Figure 3B:
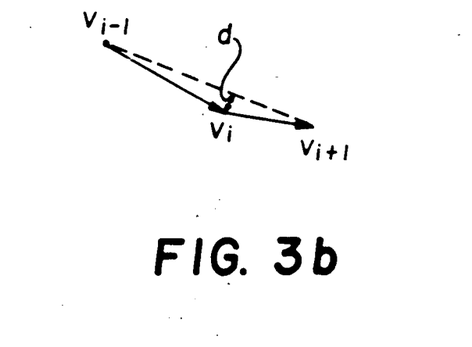
FIG. 3b illustrates how the deviation from a substitute vector is determined.

In FIG. 3b vectors $\overrightarrow{v_{i-1}v_i}$ and $\overrightarrow{v_iv_{i+1}}$ are shown if the values for d which is the deviation from a replacement vector $v_{i-1}v_{i+1}$ is below a given value, the replacement will be made. However, in the event d is above a predetermined value, the original vector will be preserved. The value of d is given by:

$$d = \frac{x_i(x_{i+1} - y_{i-1}) - y_i(x_{i+1} - x_{i-1}) + (y_{i-1}x_{i+1} - x_{i-1}y_{i+1})}{\sqrt{(x_{i+1} - x_{i-1})^2 + (y_{i+1} - y_{i-1})^2}}$$

Accordingly, the sharp corner preservation is accomplished by evaluating normalized inner product values of each of two consecutive vectors during iteration and skipping over the segment merging operator when the value is smaller than a negative threshold. The negative threshold value is selected because the innerproduct of edge segments at a sharp corner must be a negative value. Thus, the smaller the normalized value the sharper the corner it indicates. For this particular application, the threshold is set a negative value which is between −1 and 0 in radians. By incorporating this constraint in a piecewise linear approximation, it has been found that the process preserves sharp turning acute corners while smoothing out noisy short segments. It should be noted that this capability is particularly critical when linear approximation is applied to line-like objects. It should be noted that during operation of the piecewise linear approximation algorithm, the smoothing threshold is started with 1 and incremented up to the predetermined value while iteration goes along in order to minimize the distorted results obtained in linear approximation.

When completed, the contour vectorization process converts a bit map image into a collection of simple polygons. The polygon representation allows for the extraction of the hand drawn curves and the information encircled by those curves to be conducted in a more compact polygon domain requiring less memory.

Separation of Inner and Outer Contours

The group of uncorrelated polygons that was produced as a result of contour vectorization of the documents must be categorized for further processing. Accordingly, the polygons are separated into two groups—inner polygons and outer polygons which may then be used to speed up object reconstruction and to facilitate identification of the hand drawn curves.

The contour orientation discrimination parameter (R) is defined as:

$$R = \sum_{i=2}^{n-2} [(X_i - X_1)(y_{i+1} - y_1) - (X_{i+1} - X_1)(y_i - y_1)]$$

Where $X_i$ and $y_i$ are coordinates of polygon vertices, and n is the number of vertices.

Thus, a polygon having a positive R implies an outer contour (clockwise orientation). Inner contour polygons (counterclockwise) is indicated by a negative R. Then by scanning the list of polygons and examining the value of R, the collection of polygons are classified into two groups—inner and outer.

Block Segmentation

Figure 4:
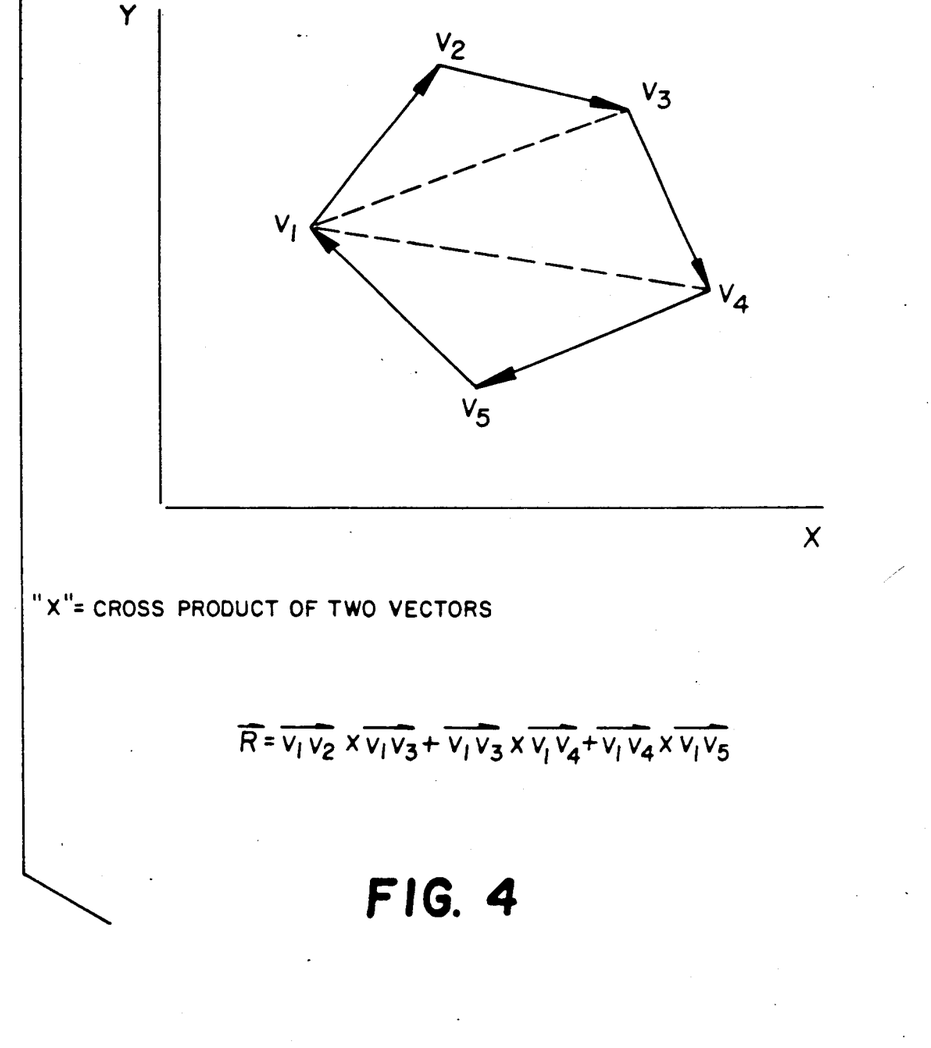
FIG. 4 illustrates graphically how the parameter "R" is defined and calculated.

This process segments both the outer polygon set and the inner polygon set into more geometrically correlated subgroups respectively as illustrated in FIG. 4. It makes the linking process for object reconstruction more efficient for each subgroup of outer contours and inner contours.

The grouping is made by first sorting polygon components to put them in a geometrical top to bottom order list. A standard sorter algorithm such as Quicksort is in the public domain, where the Y value of the corner coordinate of the polygon bounding box is taken as the sorting key value. Next, the sorted components are scanned in order to detect segmentation points. A segmentation point is found when the upper coordinate ($UY_{i+1}$) subtracts the lower coordinate ($LY_i$) results in a positive value (FIG. 4). Where i and i+1 indicate the two consecutive components in the sorted list; $UY_i$ and $LY_i$ are the upper and lower coordinates of a bounding box of a polygon in vertical directions respectively. A positive value implies a physical white gap (nonoverlap) in a horizontal projection between consecutive polygons in the sorted list. Thus, when a white space is detected, a new block segment is found. A graphical example of the block segmentation is shown in FIG. 4. The polygons assigned to the same segmentation block tend to have close geometrical links in the horizontal direction.

Contour Linking

Figure 5:
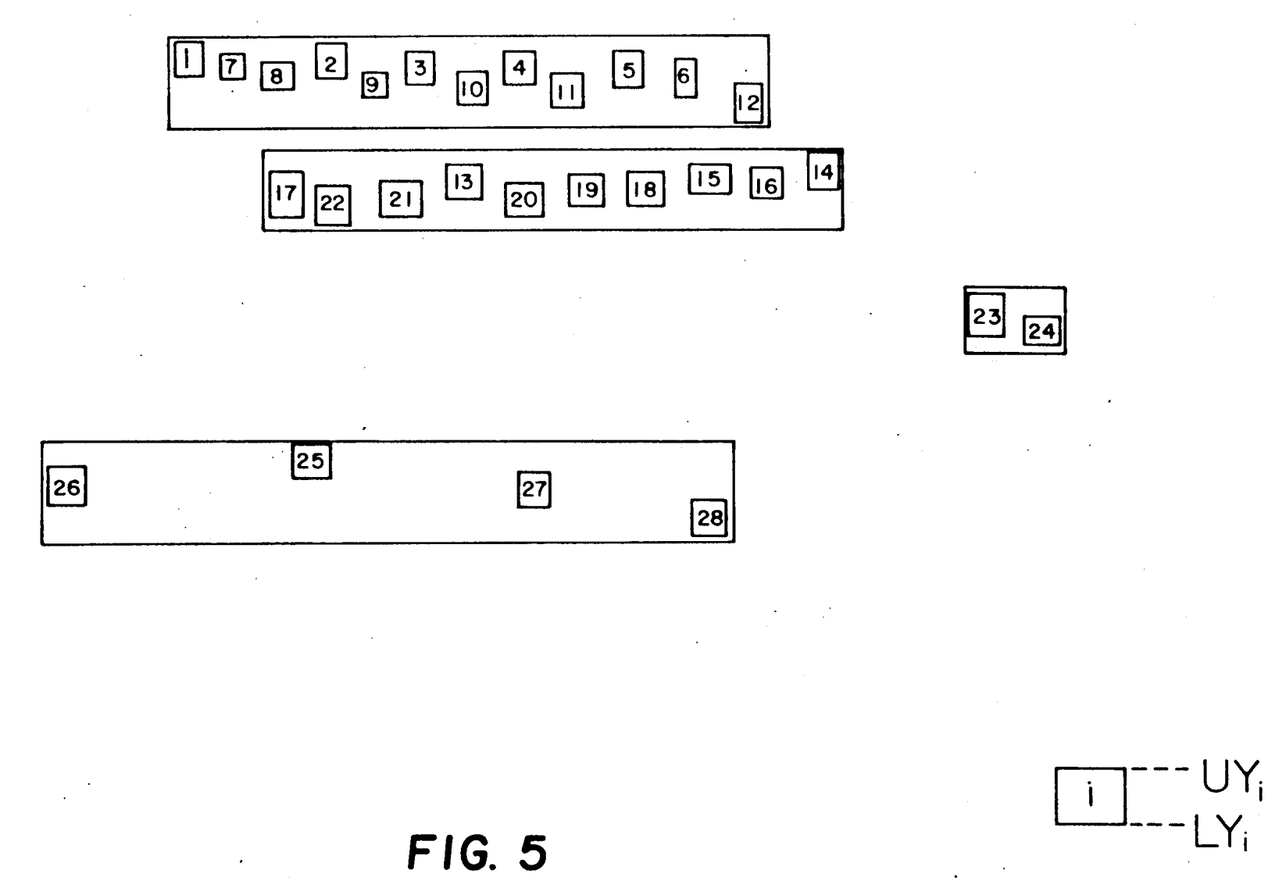
FIG. 5 shows an example of block segmentation.

This process examines geometrical relationships of the coordinates of outer and inner polygons to see whether they are geometrically connected. For example, a character is geometrically connected to a hand drawn curve when the character lies inside the boundary of the closed curve. The geometrically connected polygons are grouped and treated as an entity. FIG. 5 illustrates an example of connected polygons. The inner contour #1 is geometrically connected with the outer contour #1, #2, #3, #4, respectively.

Figure 7A:
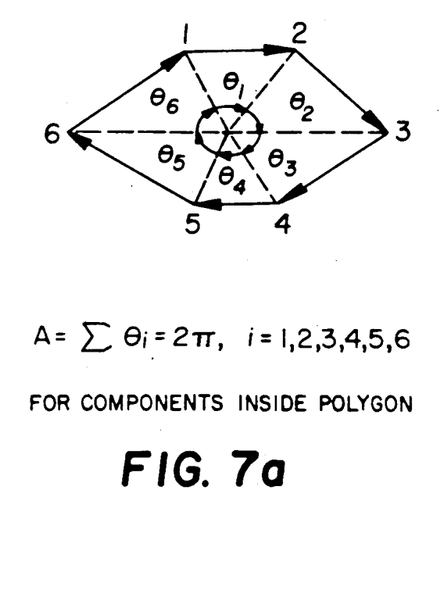
FIG. 7a is a graphical illustration of how to compute the sum of the angles from an internal angle.
Figure 7B:
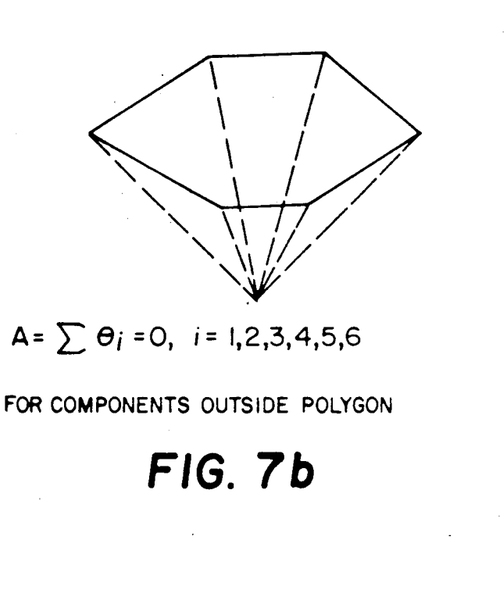
FIG. 7b illustrates how to compute the sum of the angles from an external angle.

The flowchart for the linking process is shown in FIG. 7 with the following notations:

$O_{ij}$ = jth element in the ith outer polygon block;
$I_{im}$ = mth element in ith inner polygon block;
$M_i$ = number of elements in ith outer polygon block;
$N_i$ = number of elements in ith inner polygon block;
S = number of segmented blocks.

Figure 6:
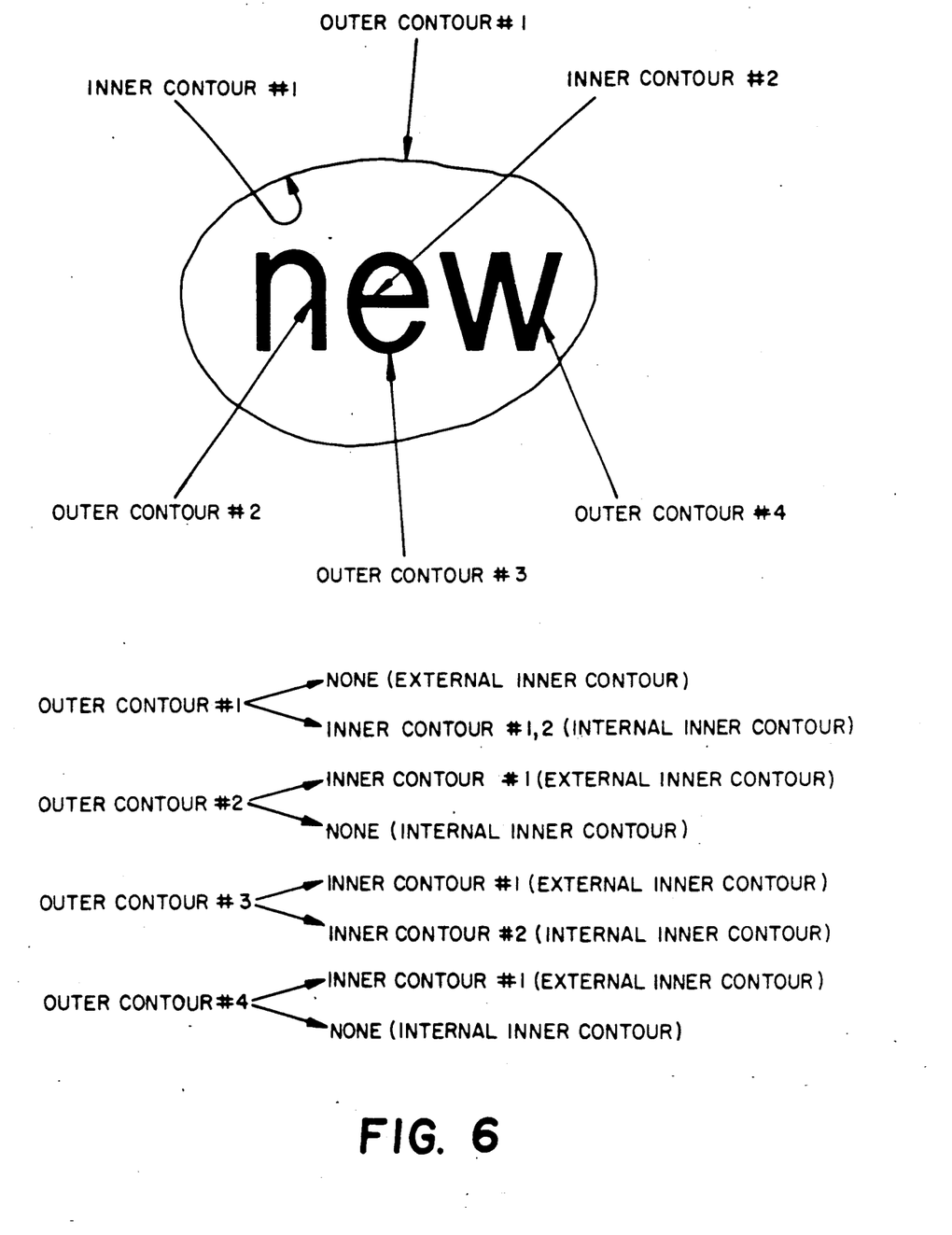
FIG. 6 shows a graphical example to illustrate the geometrically connected contours.

The process scans each outer contour ($O_{ij}$) and links the inner contours ($I_{im}$) which geometrically surround the outer contours or fall inside the outer contour. The geometrical connection is indicated by the computation of the sum of the angles (A) as shown in FIG. 6. For example, if the angular sum (A) of the centerpoint of an outer contour with respect to the vertices of the inner polygon is 0, then the outer contour must lie inside the inner contour and a geometrical connection has been established. Accordingly, the linking process proceeds between every inner and outer component and produces a list of object entities. The master element in each entity is the outer polygon and points to two sets of inner contours. The first set is called "external inner polygons" which surround the master element and the second set is called "internal inner polygons" which are located inside the boundary of the master element. FIG. 5 shows the linking result of outer and inner contours. For example, the outer contour (master element) #3 points to both the inner contour #1 (external inner polygon) and the inner contour #2 (internal inner polygon).

Text Regions Extraction

Figure 9:
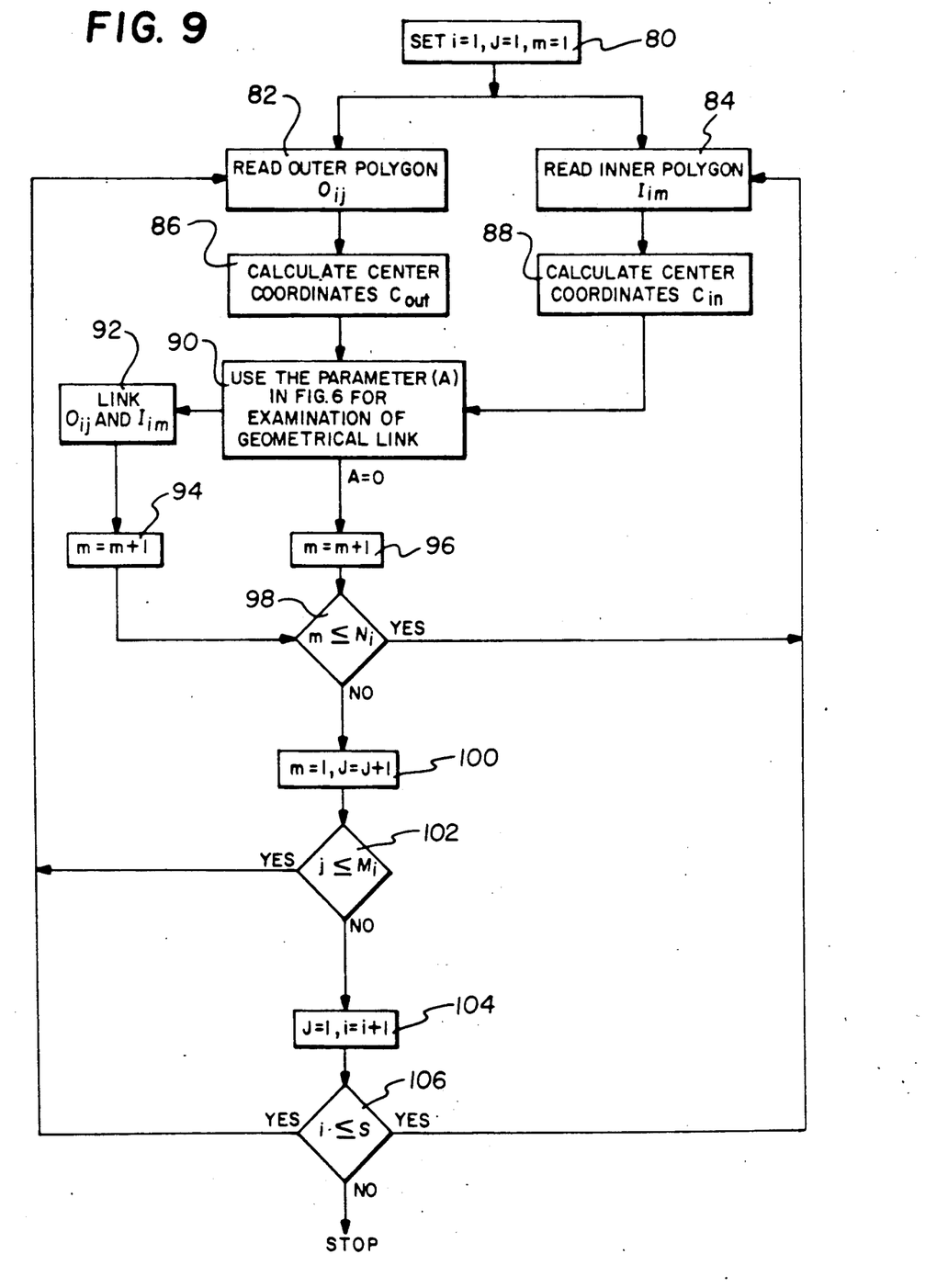
FIG. 9 is a flow diagram of the contour linking step illustrated in FIG. 7.
Figure 10:
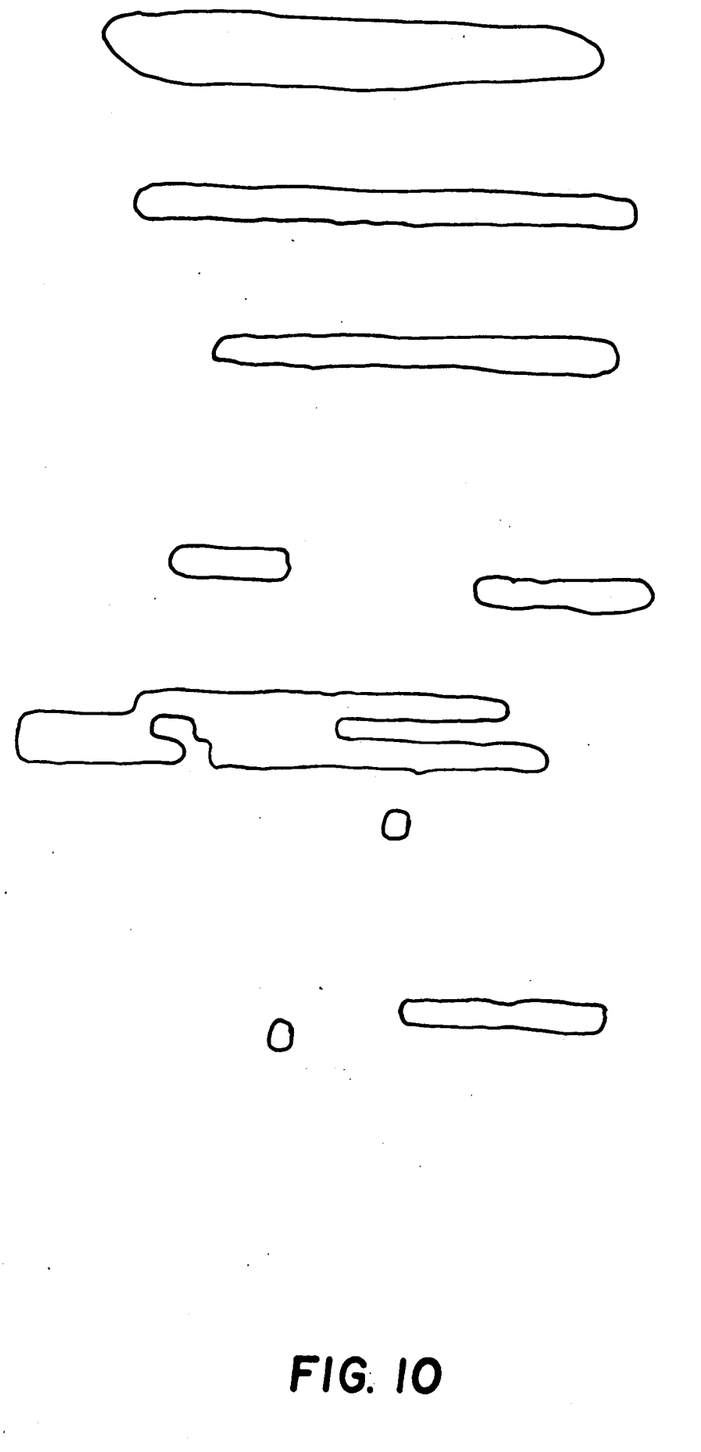
FIG. 10 illustrates the results of hand drawn curve extraction from FIG. 1.

The hand drawn curve identification is achieved by scanning a list of object entities and examining whether an "external inner polygon" is present, which detects any inner contour surrounding the outer contour. If it is found, the "external inner polygon" must be the inner contour of a hand drawn closed curve. This also means the location of the outer polygon must be part of the selected text region. FIG. 9 shows the extracted inner contours of the hand drawn closed curves from the document image shown in FIG. 1 by collecting the boundary coordinates of the outer polygons in the scan list which point to the same external inner polygon, the sum of bounding areas being collected so as to form the desired text region bounded by the boundary of a hand drawn curve. It is important to note that this process does not include any thresholding process, it is applicable to extract any sizes and shapes of hand drawn closed curves from a document having a full page of text.

Flow Charts

FIG. 7 shows the flow chart that sets forth the procedures for extracting marked text regions. Step 40 digitizes the marked paper document using a scanner which converts the paper document into a digital image. The digital image is represented by a two dimensional array of cells. The value in each cell is either "1" or "0". A black dot is indicated by "1" and the "0" is for white dot. This digitization produces a bitmap (binary) image referred to in step 42. In step 44, contour vectorization extracts the outline of any black patterns and the extracted outlines are represented in polygons-a sequence of vectors. Contour vectorization is made up of two processes—contour pixel tracing and linear approximation of contour pixels. Both of these processes have been described in detail above.

Figure 8:
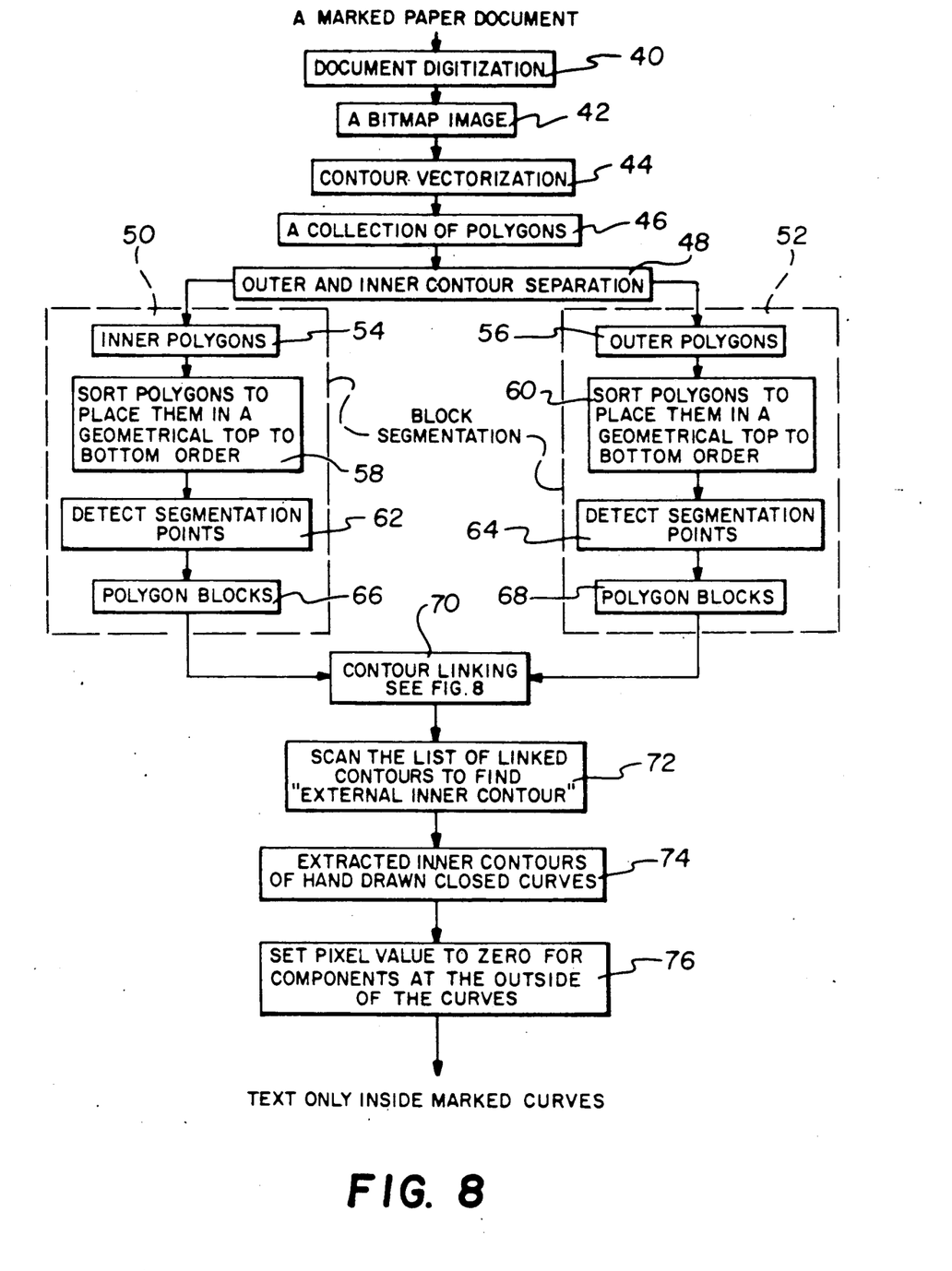
FIG. 8 is a flow diagram of the procedures used to extract marked test regions from a document.

As a result of the vectorization process, a collection of polygons have been generated in step 46. Step 48 separates the collection of polygons into two groups based on the rotational orientation of sequential vectors of the polygon. The orientation is indicated by the value of R which was explained above. In steps 50 and 52, the adjacent polygons are grouped as either inner or outer contours respectively, thereby allowing linking operation to come later to be performed more efficiently. In steps 54 and 56 two sets of polygons are classified such that they are associated with inner and outer contours respectively. In steps 58 and 60 the polygons are sorted based on their spatial coordinates and placing all the inner polygons and all the outer polygons in a geometrical top to bottom order. Steps 62 and 64 detect the segmentation points of blocks. A segmentation point as explained earlier is formed when a physical white space in a horizontal projection between two consecutive polygons is detected. In steps 66 and 68 two sets of polygons are formed with each block containing a collection of horizontally adjacent polygons. Contour linking as shown in FIG. 8 is performed in step 70. In step 72, external inner contour is identified which is defined by an outer contour surrounded by any other inner contour. In step 74, the external inner contours are defined as inner contours of the hand drawn closed curves. By collecting the bounding coordinates of the outer polygons in the scan list which points to the same external inner polygon, the sum of bounding areas being collected forms a desired test region bounded by the boundary of a hand drawn curve.

FIG. 8 illustrates the flow chart for the procedures involved in contour linking outer and inner contours. In step 80 the indices i j and m are set to 1 to initiate the program. In step 82, the program calls for the reading of the jth polygon element in the ith outer polygon block. The polygon element is called $O_{ij}$. Reading of the $I_{im}$ polygon element occurs in step 84 in the $I_{im}$ inner polygon block. The polygon element is called $I_{im}$. Step 86 calculates the center coordinate $C_{out}$ of the boundary box of the polygon ($O_{ij}$). Similarly step 88 calculates the center coordinate ($C_{in}$) of the bounding box of the polygon ($I_{ij}$). Step 90 examines the geometrical spatial relation between $O_{ij}$ and $I_{im}$ using the parameter A shown in FIG. 6. If the $C_{out}$ is taken as an internal fixed point for angular measure, the inner polygon $I_{im}$) is used for surrounding the polygon. Alternatively, if the point $C_{in}$ is taken then an outer polygon ($O_{ij}$) is used. Next, in step 92 of the value of the parameter A in $2\pi$, the outer polygon ($O_{ij}$) and the inner polygon ($I_{im}$) is considered as the same object. A pointer is set up to link the two polygons during implementation. Step 94 increases the index m in order to read the next inner polygon from the ith inner polygon block. In step 96 if the value (A) is null, then read the next inner contour by incrementing the inner polygon index m by one. In step 98, it is determining that if m is smaller than the number of polygons ($N_i$) in the ith inner polygon block, then processing the next polygon. In step 100, if the index m is greater than the Ni, then reset the inner polygon index m (=1), and read the next outer polygon by incrementing the outer polygon index by one. Step 102 continues the processing steps 82 to 100 until the last polygon being read in the ith outer polygon block. In step 104, processing of the next polygon continues by incrementing the block index and reset the outer polygon index j. Step 106 requires that the above process continues until the data is exhausted.

Advantages and Industrial Applicability

The present invention is useful in computer based systems that provide automated extraction of a marked text region in a document with a full page of text. The present invention uses the geometrical spatial relationship of the contours to identify the hand drawn components and applies their boundary coordinates for the extraction of the desired text material. The advantage of the present invention is in its robustness in identifying and locating any size and shape of hand drawn curves without using any threshold or pattern recognition methods.

What is claimed is:

1. A method of extracting marked text regions defined by hand drawn closed curves on a paper document, comprising the steps of:

raster scanning said document;

generating as the document is being scanned, a bit map representation of the document such that whenever a transition is detected, contour vectorization is used including contour pixel tracing and piecewise linear approximation to convert the bit map representation into a collection of closed polygons formed by a series of vectors;

separating the collection of polygons into inner and outer groups of contours, and the separation criteria for said groups is made by the summing the cross products given by the equation:

$$R = \sum_{i=2}^{n-2} (X_i - X_1)(Y_{i+1} - Y_1) - (X_{i+1} - X_1)(Y_i - Y_1);$$

sorting all of the inner and outer contours according to location in their respective groups;

determining segmentation points by substrating the lower coordinate ($LY_i$) from the upper coordinate ($UY_{i+1}$) and obtaining a positive value in each group of sorted contours such that overlapping contours are geometrically related to one another;

establishing polygon blocks for all polygons having a geometrical relationship in the horizontal direction;

use contour linking to examine the geometrical relationships of the coordinates of both the outer and inner contours of polygons to determine if they are geometrically overlapping;

scanning the list of linked polygons to locate external inner contours of polygons; and extracting the inner contours of polygons formed by said hand drawn closed curves from said bit map representative document using the angular sum of the centerpoint of an outer countour.

2. The method as set forth in claim 1 wherein the angular sum of the centerpoint of an outer contour which indicates a geometrical connection when:

$A = Y\theta_i = 2\pi$ for components inside the polygon and $A = Y\theta_i = 0$ for components outside the polygon.

3. The method as set forth in claim 1 wherein a further step sets pixel values to zero for pixels located outside an external inner contour.

4. A method of using contour vectorization to extract printed text regions identified by hand drawn closed curves on a paper document, comprising the steps of:

scanning said paper document and generating a bit map representation of the document;

converting said bit map representation, using contour pixel extraction and linear approximation, into a collection of polygons;

calculate the coordinates of the end points of a diagonal of a rectangle that encompasses each polygon;

classify the collection of polygons into two categories based on the feature R given by equation:

$$R = \sum_{i=2}^{n-2} (X_i - X_1)(Y_{i+1} - Y_1) - (X_{i+1} - X_1)(Y_i - Y_1);$$

wherein the first category has a negative R indicating an inner contour of a polygon and the second category has a positive R indicating an outer contour of a polygon;

sort all of the inner and outer polygon contours according to location by determining the segmentation points by substracting the lower coordinates ($LY_i$) from the upper coordinate ($UY_{i+1}$) and obtain a positive value;

calculate a value A given by equation:

$$A = \Sigma \theta_i$$

such that when $A = 0$ the contour is outside a hand drawn inner contour of the polygon and when $A = 2\pi$ identifies the hand drawn inner contour of a polygon and the region inside such polygon being the detected printed text.

* * * * *